US012401151B2

(12) United States Patent
Kliever

(10) Patent No.: US 12,401,151 B2
(45) Date of Patent: Aug. 26, 2025

(54) INSULATING BODY FOR SCREW AND CRIMP CONTACTS

(71) Applicant: HARTING Electric Stiftung & Co. KG, Espelkamp (DE)

(72) Inventor: Wilhelm Kliever, Minden (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 137 days.

(21) Appl. No.: 17/909,791

(22) PCT Filed: May 5, 2021

(86) PCT No.: PCT/DE2021/100405

§ 371 (c)(1),
(2) Date: Sep. 7, 2022

(87) PCT Pub. No.: WO2021/228321

PCT Pub. Date: Nov. 18, 2021

(65) Prior Publication Data

US 2024/0235091 A1 Jul. 11, 2024

(30) Foreign Application Priority Data

May 11, 2020 (DE) ..................... 10 2020 112 710.3

(51) Int. Cl.

| | |
|---|---|
| ***H01R 13/424*** | (2006.01) |
| ***H01R 4/18*** | (2006.01) |
| ***H01R 4/36*** | (2006.01) |
| ***H01R 13/506*** | (2006.01) |
| ***H01R 13/512*** | (2006.01) |

(52) U.S. Cl.
CPC ......... *H01R 13/424* (2013.01); *H01R 13/506* (2013.01); *H01R 13/512* (2013.01); *H01R 4/183* (2013.01); *H01R 4/36* (2013.01)

(58) Field of Classification Search
CPC .. H01R 13/424; H01R 13/506; H01R 13/512; H01R 4/183; H01R 4/36
USPC .................................................. 439/170, 171
See application file for complete search history.

(56) References Cited

U.S. PATENT DOCUMENTS 3,721,945 A * 3/1973 Hults ..................... H01R 13/20
439/846
5,059,142 A 10/1991 Ohta et al.
9,761,982 B2 * 9/2017 Bertsch .................. H01R 29/00
(Continued)

FOREIGN PATENT DOCUMENTS

CN 207559104 U 6/2018
DE 102013019695 A1 5/2015
(Continued)

*Primary Examiner* — Renee S Luebke
*Assistant Examiner* — Paul D Baillargeon
(74) *Attorney, Agent, or Firm* — Smartpat PLC

(57) ABSTRACT

In order to be able to equip a contact carrier (1) which is actually provided for receiving screw contacts, i.e. electrical plug contacts having screw connections, with crimp contacts (5) as well, a holding plate (3) can be latched on the contact carrier (1). Said holding plate (3) has a latching arm for each contact chamber of the contact carrier, said latching arm engaging in a screw connection receptacle of the contact chamber. As a result, the crimp contacts (5) inserted on the cable connection side can latch on the latching arm with their holding collar in the contact carrier (1).

11 Claims, 8 Drawing Sheets

(56) References Cited

U.S. PATENT DOCUMENTS

| | | | |
|---|---|---|---|
| 2016/0301152 | A1 | 10/2016 | Bertsch |
| 2018/0248296 | A1 | 8/2018 | Herbrechtsmeier et al. |
| 2018/0294597 | A1 | 10/2018 | Krech |
| 2021/0013664 | A1 | 1/2021 | Giesbrecht |
| 2021/0313714 | A1 | 10/2021 | Spilker et al. |

FOREIGN PATENT DOCUMENTS

| | | | |
|---|---|---|---|
| DE | 102013113975 | A1 | 6/2015 |
| DE | 102018106880 | A1 | 9/2019 |
| DE | 102018118774 | A1 | 2/2020 |
| JP | H03201374 | A | 9/1991 |
| KR | 20160089388 | A | 7/2016 |
| KR | 20180048865 | A | 5/2018 |
| WO | 2019179572 | A1 | 9/2019 |

* cited by examiner

INSULATING BODY FOR SCREW AND CRIMP CONTACTS

TECHNICAL FIELD

The disclosure relates to an insulating body, in particular for a heavy-duty plug-in connector. The disclosure further relates to a kit comprising such an insulating body as well as at least one screw contact and at least one contact screw as well as at least one crimp contact. In another aspect, the disclosure relates to a plug-in connector module. In another aspect, the disclosure relates to a plug-in connector modular system. In another aspect, the disclosure relates to a contact insert. In another aspect, the relates to a plug-in connector.

BACKGROUND

Document DE 10 2018 118 774 A1 discloses a plug-in connector consisting substantially of an insulating body and at least one contact element. The contact element is fixed directly in the insulating body, wherein the insulating body at the same time forms the plug-in connector housing of the plug-in connector.

The plug-in connector is therefore particularly simple in design and can be assembled quickly. In addition, the plug-in connector is very robust and suitable for industrial use, especially in harsh environments. The document discloses both designs suitable for the use of screw contacts and designs suitable for the use of crimp contacts. Furthermore, the use of a holding plate is disclosed for fixing the contact elements.

A disadvantage of this prior art is that insulating bodies already available on the market, which are designed to receive screw contacts, cannot receive crimp contacts and fix them with sufficient holding force. Another disadvantage is that different insulating bodies have to be designed and manufactured for crimp contacts and for screw contacts, which is cost-intensive and does not correspond to the principle of ergonomic mass production or ergonomic component and spare parts storage. This results in unnecessary manufacturing and storage effort and associated costs.

The German Patent and Trade Mark Office has searched the following prior art in the priority application for the present application: DE 10 2018 106 880 A1, DE 10 2013 019 695 A1, US 2018/0294597 A1, and CN 207 559 104 U.

SUMMARY

Insulating bodies are required to hold electrical plug-in contacts electrically insulated from each other and from their environment, in particular electrically insulated from a metal plug-in connector housing surrounding them, in through-openings provided for this purpose, namely so-called contact chambers, and to fix them therein with a sufficient holding force which at least withstands the plugging forces occurring during the plugging process.

The plug-in contacts are to be electrically conductively connected to an electrical conductor each on the cable connection side and are to be electrically connected to mating plug-in contacts of a mating plug-in connector on the plug-in side.

Such an insulating body can be part of a contact insert, which is usually intended to be installed directly in a plug-in connector housing. The contact insert can then comprise, for example, the insulating body with two grounding elements as well as plug-in contacts inserted into the insulating body.

However, such an insulating body can also be part of a plug-in connector module. Such plug-in connector modules are inserted into corresponding holding frames, which are sometimes also referred to as hinged frames, module frames, modular frames, or plug-in connector modular frames. These holding frames are thus used to hold a number of plug-in connector modules that are similar to one another and/or also different from one another and to securely fasten them to a surface and/or a device wall and/or to install them in a plug-in connector housing, in particular in a metal heavy-duty plug-in connector housing.

Plug-in connector modules are thus required together with said holding frame as part of a plug-in connector modular system in order to be able to flexibly adapt a plug-in connector, in particular a heavy industrial plug-in connector, to specific requirements regarding signal and power transmission, for example between two electrical devices.

For this purpose, the plug-in connector modules can have latching means, in particular latching lugs, on the narrow sides of their substantially cuboid insulating body for fastening in corresponding receptacles, for example latching windows, of the holding frame. In particular, the latching lugs of the two mutually opposite narrow sides can differ, for example can be of different widths, and the corresponding latching windows on two opposite side parts of the holding frame can correspond to this shape, so that the correct orientation, specifically the so-called "polarization" of the plug-in connector modules in the plug-in connector module frame is ensured.

Plug-in connector modules can have plug-in contacts of various types and can fix them within their insulating bodies. The function of a plug-in connector that has a plug-in connector modular system is therefore very flexible. Depending on the design and the type of their contacts, for example optical modules for optical waveguides and/or pneumatic modules with pneumatic contacts and/or modules each with special electrical high-current contacts for the transmission of electrical energy and/or also modules with electrical contacts specially suitable for signal transmission and/or high-frequency transmission for electrical, analog and/or digital signal transmission can be accommodated in the corresponding holding frame and thus can be used in the plug-in connector modular system.

In particular, electrical contacts which are suitable for the transmission of electrical energy, i.e. which are designed, for example, for particularly high electrical voltages and/or for particularly high electrical current transmission, can thus be part of such a plug-in connector modular system. Therefore, the plug-in connector with its housing and grounding, as well as the clearance and creepage distances made possible by its design, should meet the requirements of a heavy-duty plug-in connector.

So-called hinged frames are often used as holding frames for plug-in connector modular systems. These hinged frames are formed from two frame halves which are hinged together. The side parts of the frame halves are provided with said latching windows, into which the latching lugs dip when the plug-in connector modules are inserted into the holding frame. To insert the plug-in connector modules, the holding frame is unfolded, i.e. opened, wherein the frame halves are unfolded about the joints only so far that the plug-in connector modules can be inserted. The frame halves are then folded together, i.e. the holding frame is closed, wherein the latching lugs enter the latching windows and a secure, form-fitting holding of the plug-in connector modules in the holding frame is realized. Recently, particularly advantageous hinged frames have also become known which latch in the open state as well as in the closed state to facilitate operation.

By screwing their respective flanges to a surface, for example when installed in a plug-in connector housing with flat inner contours, the frame halves of the hinged frame are fixed in their closed state—and thus also the plug-in connector modules latched between them—permanently and with high holding force.

However, for certain applications and protective grounding classes, one-piece plastics frames can also be used as holding frames, wherein the material elasticity allows the modules to be inserted and removed in the plug-in direction, i.e. perpendicular to the frame plane, while still being held stably in the frame plane. In the case of the plastics frame, the desired elasticity of the various regions can be achieved in particular via the material thickness in the corresponding regions.

Furthermore, plug-in connector modular frames can be used, each with a rigid base frame, wherein the base frames, viewed ideally, are rigid and manufactured for example by zinc die-casting, and which are each provided on their longitudinal sides with one or more flexible cheek parts, for example stamped and bent parts made of spring-elastic sheet metal. Such plug-in connector modular frames have the advantage that the plug-in connector modules can be inserted into the plug-in connector modular frame with little effort and that they are at the same time made of metal to allow protective grounding (PE).

An object of the disclosure is to describe an insulating body which can accommodate electrical plug-in contacts both in the form of screw contacts and in the form of crimp contacts and fixes them, in particular for use in a heavy-duty connector, in each case stably enough to absorb the plugging forces occurring in the plugging process. The electrical plug-in contacts can be both male and female contacts.

The object is achieved by the subject manner as claimed.

An insulating body has a contact carrier and a holding plate which can be latched thereto. The contact carrier has two mutually opposite longitudinal sides oriented in a longitudinal direction of the insulating body and two mutually opposite narrow sides oriented perpendicularly thereto. Perpendicularly to the longitudinal and narrow sides, the insulating body has a cable connection side and a plug-in side.

Furthermore, the contact carrier has contact chambers which run in the plug-in direction and connect the cable connection side to the plug-in side.

A first group of contact chambers is arranged in the vicinity of one of the longitudinal sides and a second group of contact chambers is arranged in the vicinity of the other longitudinal side.

The contact chambers of the first group and the contact chambers of the second group are arranged offset from one another in said longitudinal direction. This is advantageous in order to provide sufficient installation space in the contact carrier for the screw connection mechanism described below:

The contact chambers are cylindrical at their plug-in-side end. At their cable-connection-side end, the contact chambers have, in addition to their cylindrical shape, in each case a screw connection receptacle which adjoins said end laterally. This screw connection receptacle points in the direction of the opposite longitudinal side. Furthermore, for the purpose of fixing and contacting on the cable connection side a screw contact arranged or to be arranged in the contact chamber by means of a contact screw through a screw bushing running in the direction of said opposite longitudinal side, the screw connection receptacle is open towards this opposite longitudinal side.

The holding plate has a substantially rectangular base plate on which two side plates are integrally molded longitudinally opposite one another and pointing in a common direction. Latching elements are arranged in each of these side plates for said latching of the holding plate to the contact carrier. In particular, these latching elements may be latching tabs which have an inwardly angled or bent latching portion at their free-standing end and which serve for latching to the contact carrier, in particular at an edge of its cable connection side.

In the latched state, the base plate of the holding plate comes to lie on the cable connection side of the contact carrier. Furthermore, contact bushings are arranged in the base plate which, in the latched state, are arranged above respective contact chambers. In this latched state, the base plate engages with a latching arm arranged at its contact bushings into the screw connection receptacle of the corresponding contact chamber of the contact carrier in order to fix a crimp contact inserted or to be inserted into the contact chamber.

One advantage of this insulating body is that it can be used both in combination with screw contacts and in combination with crimp contacts. This can be done particularly advantageously in the form of a modular system, which saves storage and manufacturing effort on the part of the manufacturer and at least storage effort on the part of the customer. Lastly, only the holding plate needs to be latched onto a contact carrier that is suitable for accommodating screw contacts in order to enable it to accommodate crimp contacts. From the manufacturer's point of view, it is particularly advantageous that the contact carrier can be a product that already exists on the market and is retrofitted with the holding plate to accommodate crimp contacts, that is to say is enriched by the holding plate with this additional application.

It is particularly advantageous if two naturally different contact carriers belonging to a plug-in system, namely a male contact carrier for receiving male contacts and a female contact carrier pluggable therewith for receiving female contacts, can be made to be able to accommodate crimp contacts by only one type of holding plate. This is particularly advantageous because it means that only holding plates of one design need to be kept available for the entire plug-in system. Due to structural differences between the male and female contact carriers, however, it can also be useful to design the holding plate in two variants, that is to say in one design for the male contact carrier and in another design for the female contact carrier. For example, these two designs of the holding plate can be mirror-inverted to each other. However, it may also be necessary to slightly adapt the shape of the latching elements and/or the shape of the latching arms.

It is of course clear to a person skilled in the art that the terms "male and female contacts" refer to the design of the plug-in region of the particular plug-in contact. The term "crimp and screw contacts", on the other hand, refers to the cable connection region and the type of connection of an electrical conductor. Thus, a crimp contact can be embodied as a male and as a female contact. Likewise, a screw contact can be embodied as both a male and a female contact.

However, the basic principle of latching and fixing the crimp contacts by the holding plate in the contact carrier, which is also suitable for receiving and fixing screw contacts, remains the same for male and female contact carriers and is therefore described below jointly for both.

Thus, as already mentioned, the contact carrier can, on the one hand, be used together with screw contacts which are already inserted into the contact chambers at the factory or are inserted into the contact chambers for this purpose by the user and are then fixed in the contact carrier by means of contact screws passed through the screw bushings, wherein these contact screws simultaneously contact electrical conductors inserted on the cable connection side with the screw contacts and mechanically fix them thereto.

On the other hand, the contact carrier can also be used in combination with the holding plate and crimp contacts. The crimp contacts are usually pre-assembled, that is to say pressed, i.e. crimped, on electrical conductors, in particular on wire strands, of an electrical cable, in particular a multi-core cable. In the preassembled state, they can be guided through the contact guides of said base plate, which is latched to the contact carrier, and thus plugged into the contact chamber of the contact carrier from the direction of the cable connection side. They have a holding collar, by which they abut a feed stop of the contact chamber during the insertion process, which prevents further insertion in the direction of the plug-in side. They are held against forces acting in the direction of the plug-in side in particular by an inner collar on the inner side acting as a feed stop, i.e. a taper of the contact chamber.

At the same time, their holding collar can latch on said latching arm of the holding plate. In the direction of the cable connection side, they are thus held by the latching arm to which they are latched. In accordance with the principle of a barb, the latching arm allows the crimp contact to be inserted from the direction of the cable connection side, but prevents the crimp contact from moving out in the opposite direction towards the cable connection side, for example when high plug-in forces occur or, for example, due to high cable tensile forces.

For disassembly, i.e. for removing the crimp contacts, the holding plate can first be unlatched from the contact carrier. After the holding plate has been removed from the contact carrier, the crimp contacts can be removed again in the direction of the cable connection side, for example for disassembly. Alternatively, the crimp contacts can also be released from the insulating body and removed using a disassembly tool. In this case, the disassembly tool can push the latching arm to the side and grip around the crimp contact with sufficient force to remove it in the direction of the cable connection side.

In a particularly advantageous embodiment, the insulating body, comprising the contact carrier and the holding plate which can be latched thereto, can be used as a component of a plug-in connector module for a plug-in connector modular system. For this purpose, a latching lug can be integrally molded on each of the two narrow sides of its contact carrier for latching in latching windows of a holding frame. The ability of the insulating body to accommodate and fix both crimp and screw contacts means that this option can then also be added to the plug-in connector modular system with only minimal manufacturing, storage, and material effort.

The two latching lugs may differ in shape and/or size. This is advantageous to ensure the correct orientation of the plug-in connector module, for example in said holding frame.

In another preferred embodiment, the insulating body may be part of a contact insert. As mentioned above, such a contact insert is usually intended to be installed directly in a plug-in connector housing. For this purpose, the contact insert can have a metal grounding element on each of its two opposing narrow sides. The two grounding elements can thereby be regarded as part of the contact carrier. The insulating body can have the contact carrier and the holding plate.

Each grounding element can have a fastening flange with at least one, preferably several, in particular two screw apertures. A person skilled in the art understands from this that the presence of at least two screw apertures in the corresponding fastening flange is also disclosed.

A metal fixing screw can be rotatably held in at least one, preferably several, particularly preferably each of the screw apertures of each flange. The fixing screws can be used to screw the contact insert into the plug-in connector housing, which is in particular at least partially metallic, for fastening purposes. At the same time, a grounding/protective ground conductor connection can be made in this way. For this purpose, at least one of the two grounding elements can have a grounding screw that can be screwed into the grounding element, for example into a grounding screw hole of the grounding element, for the purpose of fixing and electrically contacting a grounding cable that serves as a PE (protective earth) conductor. Advantageously, the plug-in portion of the grounding element can also be used to establish a ground connection to the grounding element of a mating plug-in connector.

For this purpose, a connecting slot running in the plug-in direction can be arranged on each of the two narrow sides of the contact carrier, and the corresponding grounding element engages with its plug-in portion in said connecting slot. In particular, on the plug-in side on its narrow sides, the contact carrier can have a grounding element receptacle, through which this connecting slot runs.

An advantageously versatile kit has at least the following components:

- an insulating body of the aforementioned type;
- at least one screw contact;
- at least one contact screw; and
- at least one crimp contact;
- wherein
- both the screw contact and the crimp contact each have a plug-in region and a cable connection region with a cable-connection-side cavity for receiving, fixing, and making electrical contact with an electrical conductor,
- wherein the cable connection region of the screw contact has a screw connection with a screw hole that directly adjoins the cavity of the screw contact;
- wherein the screw hole has an internal thread,
- wherein the screw contact is insertable into a contact chamber of the contact carrier, wherein the screw connection is receivable by the screw connection receptacle of the contact carrier so that the screw hole directly adjoins the screw bushing of the contact carrier so that
- the contact screw can be guided through the screw bushing and can be screwed into the screw hole and thus into the cavity of the screw contact in order to electrically connect an electrical conductor inserted into the cavity on the cable connection side to the screw contact and simultaneously to fix the screw contact in the contact carrier;
- wherein the cable connection portion of the crimp contact has a hollow-cylindrical crimp connection, through which the cable-connection-side cavity is formed, and
- wherein the crimp contact further comprises a holding collar between its cable connection region and its plug-in region,
- wherein the crimp contact can be guided through one of the contact bushings of the holding plate latched to the contact carrier and can be inserted into the contact chamber of the contact carrier until its holding collar abuts a taper of the contact chamber acting as a feed stop, wherein the crimp contact can be ultimately fixed in the contact chamber of the contact carrier by its collar latching on the latching arm of the holding plate.

The plug-in contacts thus each have a plug-in region and a cable connection region, wherein the cable connection region has a cavity for receiving an electrical conductor, for example the stranded wire of said multi-core electrical cable. Due to the design of their plug-in region, the contacts can, for example, be embodied both as male contacts and as female contacts. However, other designs are of course also conceivable, for example hermaphroditic plug-in contacts.

Advantageously, the insulating body is suitable for accommodating screw contacts due to its contact carrier with the contact chambers with their screw connection receptacles. Screw contacts are those plug-in contacts to be accommodated by the contact carrier which have a screw connection so that an electrical conductor to be connected to them can be screwed to their cable connection region. For this purpose, the electrical conductor is inserted into a cavity on the cable connection side of the screw contact and, by means of said, in particular lateral, screw connection and the screw hole located therein, which has an internal thread, is electrically contacted and at the same time mechanically fixed by the contact screw manually screwed into it. During the screwing process, the contact screw penetrates the cavity of the cable connection region of the screw contact and presses the electrical conductor, which is usually a stranded wire, for example a stranded wire of the electrical cable, against an inner wall of the cable connection region of the screw contact for electrical contact and mechanical fixing.

The contact carrier has said screw bushing to enable the screw connection, so that both the electrical conductor in the screw contact and the screw contact already arranged in the contact chamber of the insulating body can be ultimately fixed in the contact carrier with the contact screw passed through.

To meet the space requirements of the cable connection regions of the screw contacts in the contact carrier, the contact chambers in the contact carrier are arranged offset from one another. The screw opening then connects them in each case to the opposite longitudinal side, i.e. to that of the two longitudinal sides from which they are furthest away. This provides sufficient space in the contact carrier for the aforementioned screw connection mechanism.

Such a screw contact has the advantage of being suitable for assembly in the field, i.e. it can also be operated without special tools and without the use of specially trained personnel. It can be supplied with screw contacts already inserted at the factory and contact screws already partially screwed into the screw connection therein.

Then, only two steps need to be taken by the user:

1. the electrical conductor must be inserted on the cable connection side into the contact chamber of the insulating body—and thus automatically into the cavity of the plug-in contact preferably already inserted therein at the factory; and
2. thereupon must be finally screwed tightly perpendicularly thereto through the screw opening by means of the contact screw, which is preferably already partially screwed into the screw hole of the screw connection of the screw contact through the screw opening of the insulating body at the factory.

In addition, the insulating body has the advantage that it is also suitable for receiving preassembled crimp contacts. The preassembled crimp contacts are distinguished, among other things, by the fact that an electrical conductor inserted into the cavity of the contact region is crimped to them by means of a crimp connection.

To fix these crimp contacts, the insulating body has, in addition to its contact carrier, the holding plate which can be latched to it on the cable connection side and is latched to it for this application. The latching arm of the holding plate engages in the screw connection receptacle of the contact chamber, whereby the contact chamber with its screw connection receptacle experiences a new application, namely the possibility of receiving and fixing a crimp contact.

Now, the crimp contact can be inserted into the contact chamber on the cable connection side until its holding collar abuts the feed stop of the contact chamber on the plug-in side. At the same time, the holding collar latches on the latching arm on the cable connection side, in particular on a latching hook of the latching arm, according to the principle of a barb. The crimp contact can thus be inserted into the insulating body in this way, but cannot be removed again without further ado, because in order to remove it, the holding plate would first have to be unlatched from the contact carrier or said removal tool would have to be inserted. Instead, the crimp contact is held in the insulating body in the latched state with a high holding force against plug-in forces.

Thus, by using the latching arm with the crimp contact and the holding plate with the contact carrier, the screw connection receptacle of the contact carrier acquires a new function, namely that of receiving the latching arm to fix the crimp contact to its holding collar with high holding force.

BRIEF DESCRIPTION OF THE DRAWINGS

An exemplary embodiment of the invention is shown in the drawings and is explained in more detail below. In the drawings.

DETAILED DESCRIPTION

The FIGS. contain partially simplified, schematic representations. In part, identical reference signs are used for like but possibly not identical elements. Different views of identical elements might be scaled differently.

FIGS. 1*a* to 1*f* show an insulating body or at least one or more parts thereof.

Figure 1A:
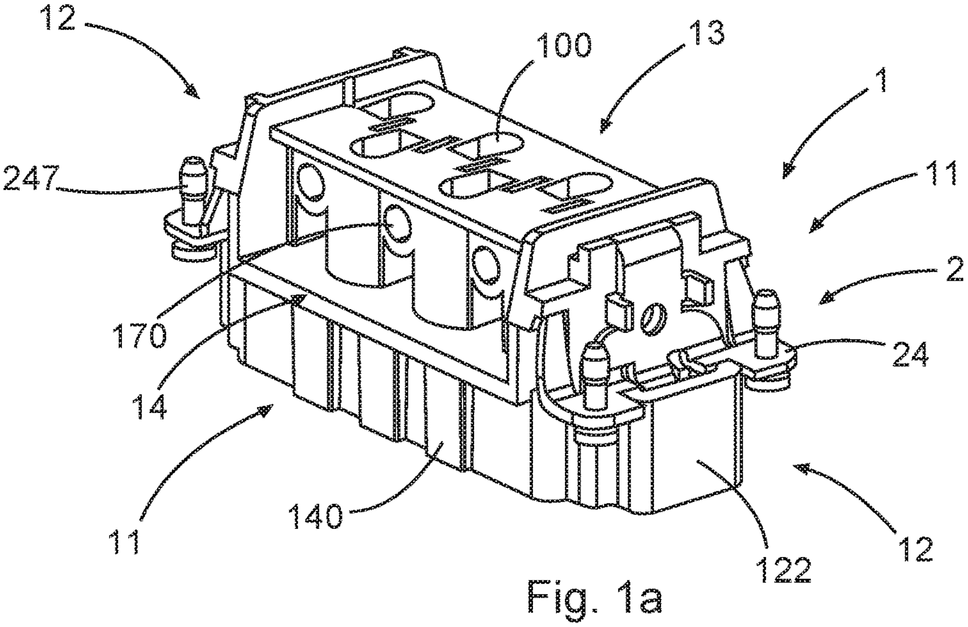
FIG. 1*a* shows a male contact carrier in an oblique plan view of the cable connection side.

FIG. 1*a* shows a contact carrier, namely a male contact carrier 1. This has two mutually opposite longitudinal sides 11, two mutually opposite narrow sides 12 at right angles thereto, and a cable connection side 13 and a plug-in side 14, which are oriented perpendicularly to these 11, 12 and are opposite one another.

A plug-in frame 140 adjoins the plug-in side 14.

The cable connection side 13 and the plug-in side 14 are interconnected by contact chambers 100. In this example, there are six contact chambers 100, but of course a different number of contact chambers 100 may be provided in the male contact carrier 1. One group of these contact chambers 100, namely three of the contact chambers 100 in this example, are arranged on one of the two longitudinal sides 11, and another group of the contact chambers 100, namely the remaining three contact chambers 100, are arranged on the opposite longitudinal side 11, offset therefrom in the longitudinal direction of the insulating body.

Each contact chamber 100 is open towards the opposite longitudinal side 11 by a screw aperture 170 running in the direction of the opposite longitudinal side 11.

Figure 1B:
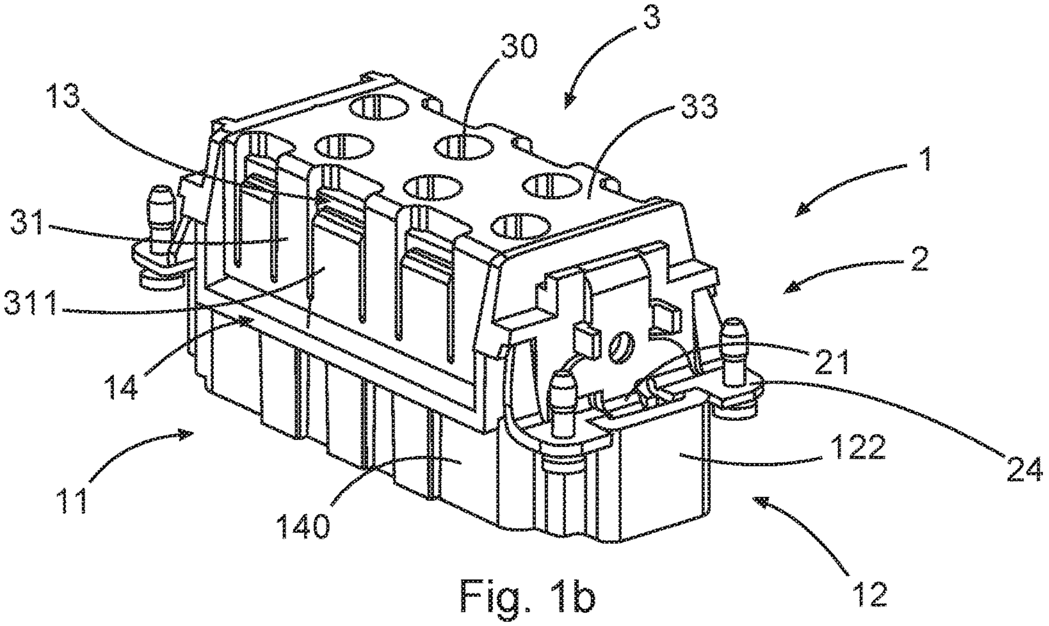
FIG. 1*b* shows the male contact carrier with a holding plate latched thereto.

FIG. 1*b* shows said insulating body, which has the male contact carrier 1 and a holding plate 3 latched onto the male contact carrier 1. The holding plate 3 has a base plate 33, which lies on the cable connection side 13 of the male contact carrier 1. Contact bushings 30 are arranged in the base plate 33 and lie directly one above each of the contact chambers 100 of the male contact carrier 1. Furthermore, on both sides, namely on the longitudinal sides, of the base plate 33 there are formed two side plates 31, which are opposite one another and engage in the male contact carrier 1 on both sides, with only one of said side plates being visible in this illustration. A plurality of latching elements in the form of latching tabs 311 are arranged therein and latch against an edge of the cable connection side 13.

The male contact carrier 1 has a grounding element receptacle 122 on each of its narrow sides 12. Furthermore, a grounding element 2 is attached to each narrow side 12. This grounding element 2 has a fastening flange 24 which runs parallel to the plug-in side 14. Two threadless screw apertures are arranged in each fastening flange 24, but are not provided with a reference sign for reasons of clarity. A fixing screw 247 is guided through each screw aperture and is rotatably held thereon. As a result, a contact insert which has the insulating body with the two grounding elements 2 is suitable for direct installation in a plug-in connector housing and, if necessary, for ground connection thereto. Furthermore, a plug-in portion 21 of the grounding element 2, which projects into the grounding element receptacle 122, can already be seen to some extent in this embodiment.

Figure 1C:
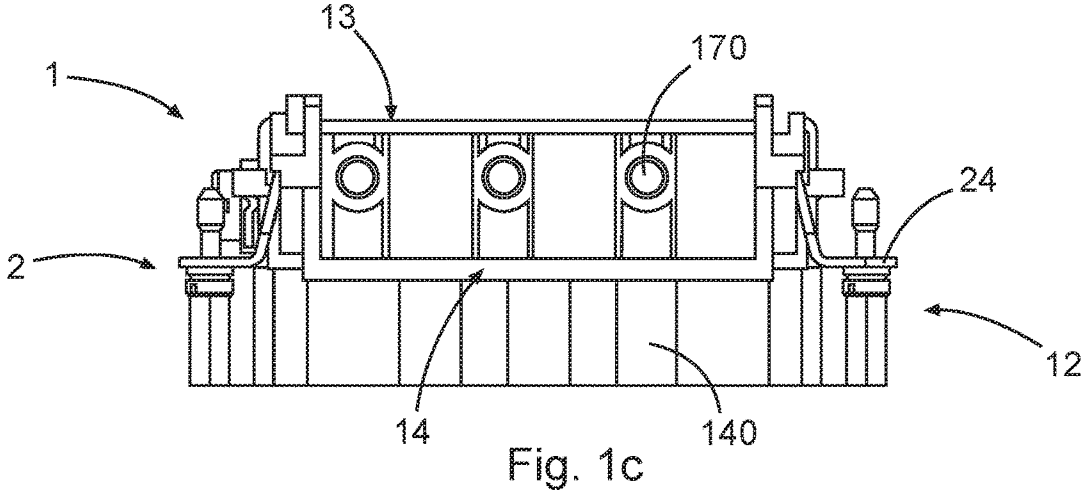
FIGS. 1*c-f* show the male contact carrier in various further views.

FIG. 1*c* shows the male contact carrier 1 in a side view looking at one of its longitudinal sides 11.

Figure 1D:
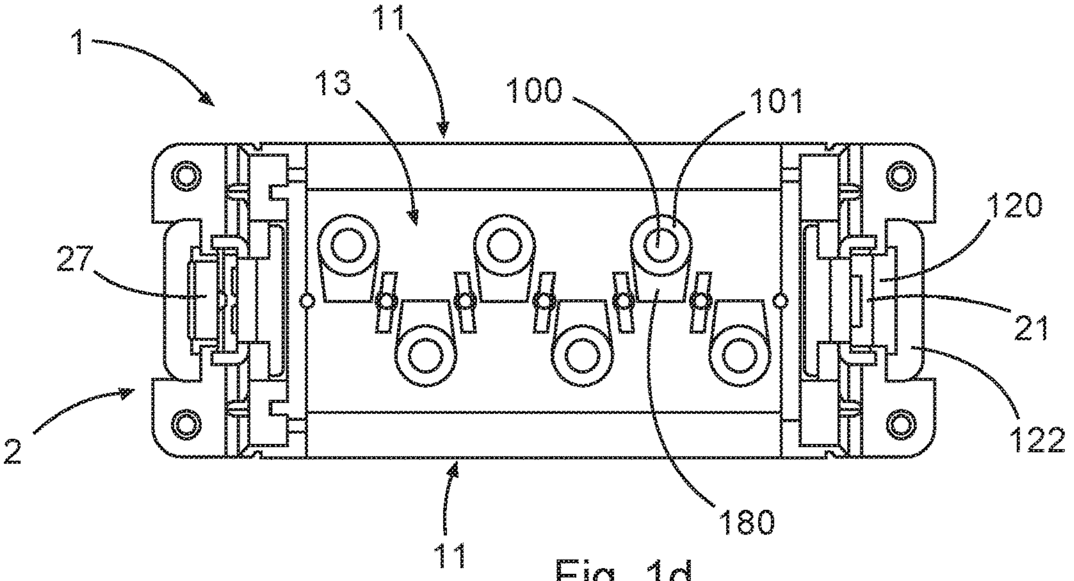

FIG. 1*d* shows the male contact carrier 1 in a plan view of its cable connection side 13. Here, it can be clearly seen how the plug-in portion 21 of the grounding element 2 engages in a connecting slot 120 of the grounding element receptacle 122 running in the plug-in direction.

Furthermore, it can be seen clearly from this view that the contact receptacle 100 of the male contact carrier 1 has a taper in the form of an inner collar 101 as a feed stop for male contacts 4,5 to be inserted (shown below). In addition, a screw connection receptacle 180 can be seen as part of each contact chamber 100 and in each case points in the direction of the opposite longitudinal side 11.

Furthermore, a grounding screw 27 can be seen, which is screwed into one of the grounding elements 2 and serves to connect a "PE" (protective earth) conductor, namely a grounding cable, which is not shown.

Figure 1E:
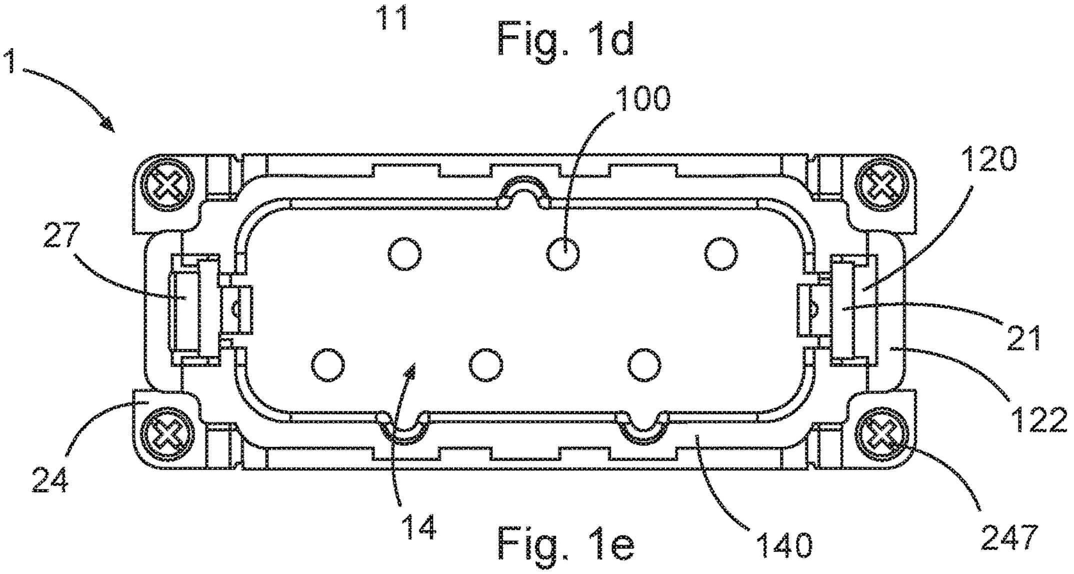

FIG. 1*e* shows the male contact carrier 1 from the opposite direction, namely looking at the plug-in side 14. This illustration also shows the function of the mating frame 140, which surrounds the plug-in side 14.

Figure 1F:
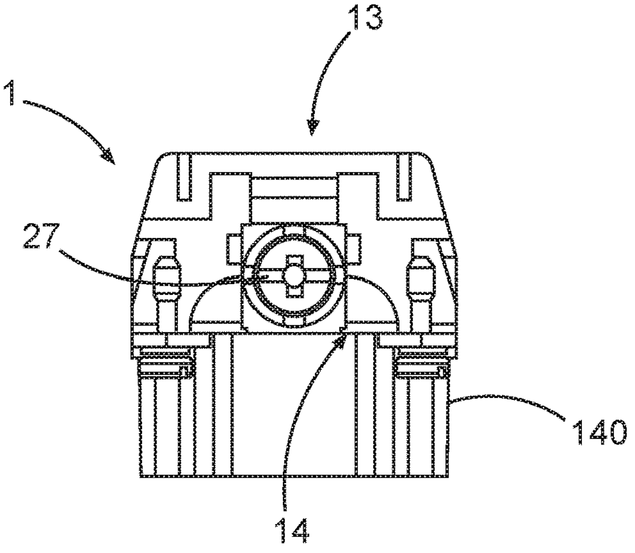

FIG. 1*f* shows the male contact carrier 1 viewed from one of its narrow sides 12.

FIGS. 2*a* to 2*h* show a further insulating body or at least one or more parts thereof.

Figure 2A:
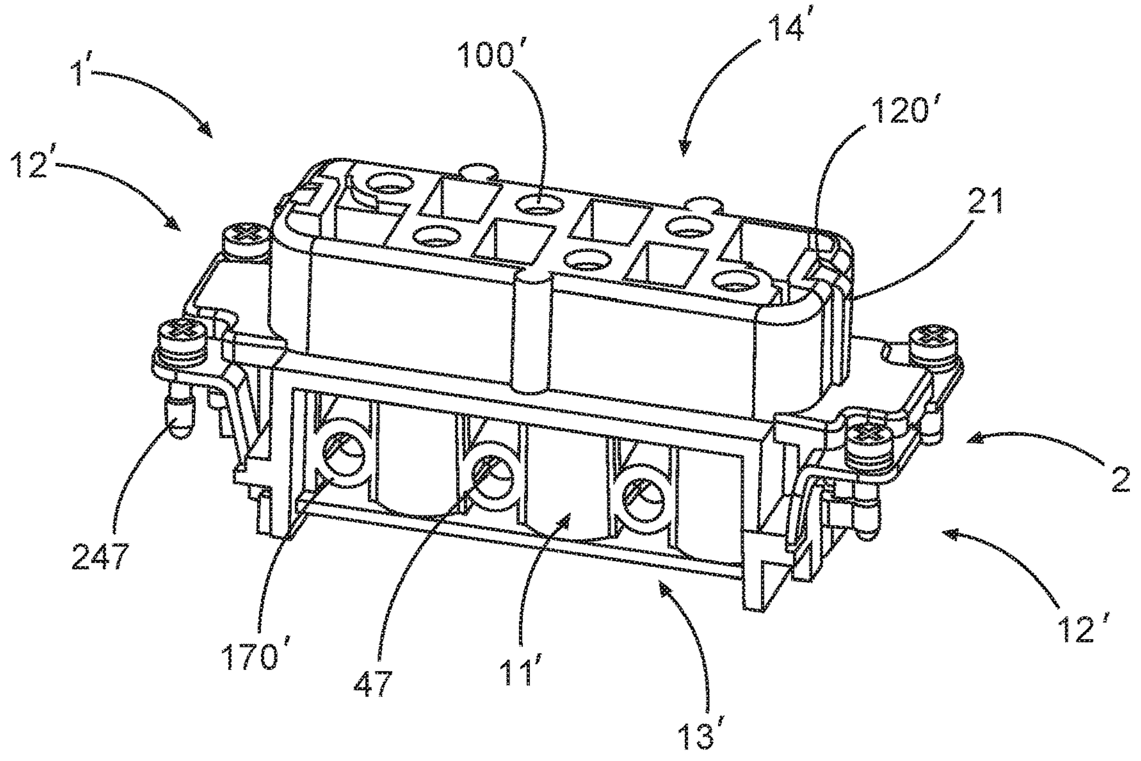
FIGS. 2*a*, 2*b* show an oblique plan view of the female contact carrier from the plug-in side and the cable connection side.
Figure 2B:
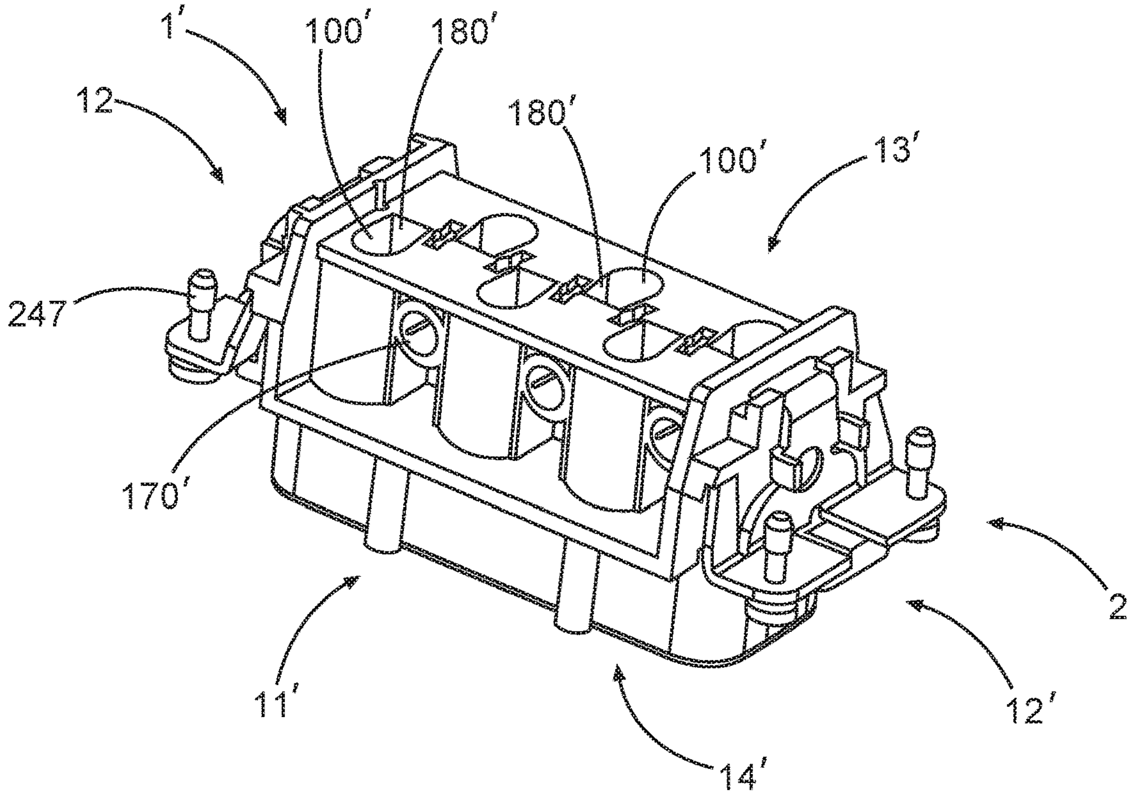

FIGS. 2*a* and 2*b* show a further contact carrier, namely a female contact carrier 1', in an oblique plan view of its plug-in 14' and cable connection side 13', respectively. This carrier 1' has two opposite longitudinal sides 11', and at right angles thereto two opposite narrow sides 12', as well as the cable connection side 13' and the plug-in side 14', which are oriented perpendicularly to these 11',12' and are opposite one another.

The cable connection side 13' and the plug-in side 14' are interconnected by contact chambers 100'. In this example, six contact chambers 100' are present, but of course a different number of contact chambers 100' may be present in the female contact carrier 1'. One group of these contact chambers 100', namely three of the contact chambers 100' in this example, are arranged on one of the two longitudinal sides 11', and another group of the contact chambers 100', namely the remaining three contact chambers 100', are arranged on the opposite longitudinal side 11' offset therefrom in the longitudinal direction of the insulating body.

Each contact chamber 100' is open towards this opposite longitudinal side 11' by a screw bushing 170' running in the direction of the opposite longitudinal side 11'. In FIG. 2*a*, a contact screw 47 is indicated in each screw bushing. With this contact screw 47, a screw contact 4 arranged in the contact chamber 100' can be both connected to an electrical conductor inserted on the cable connection side and can be fixed itself in the contact carrier 1'.

Figure 2C:
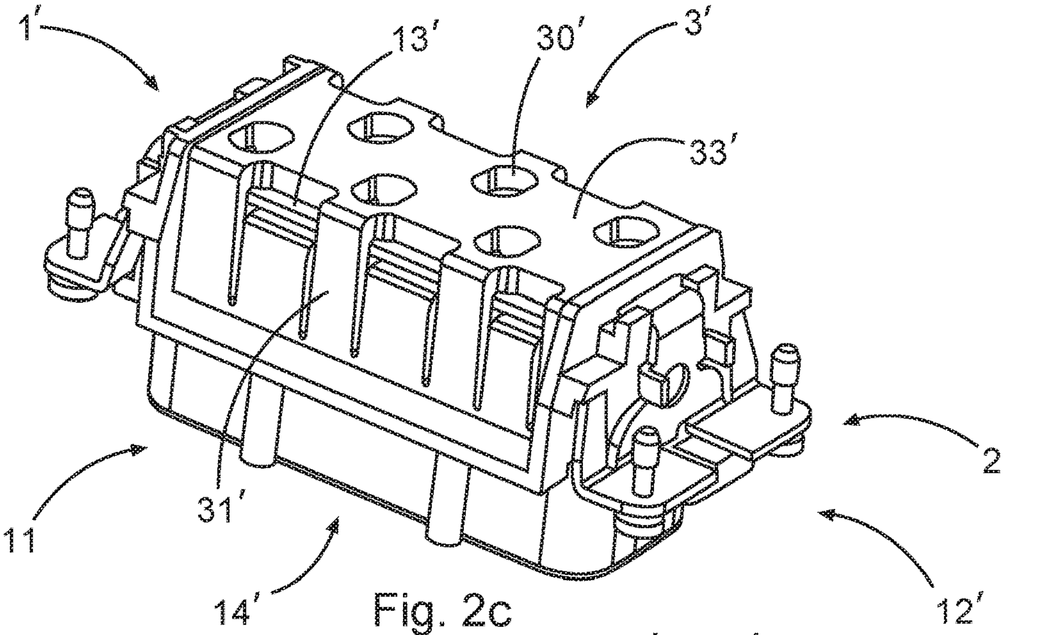
FIGS. 2*c, d* show the female contact carrier with a holding plate latched thereto.
Figure 2D:
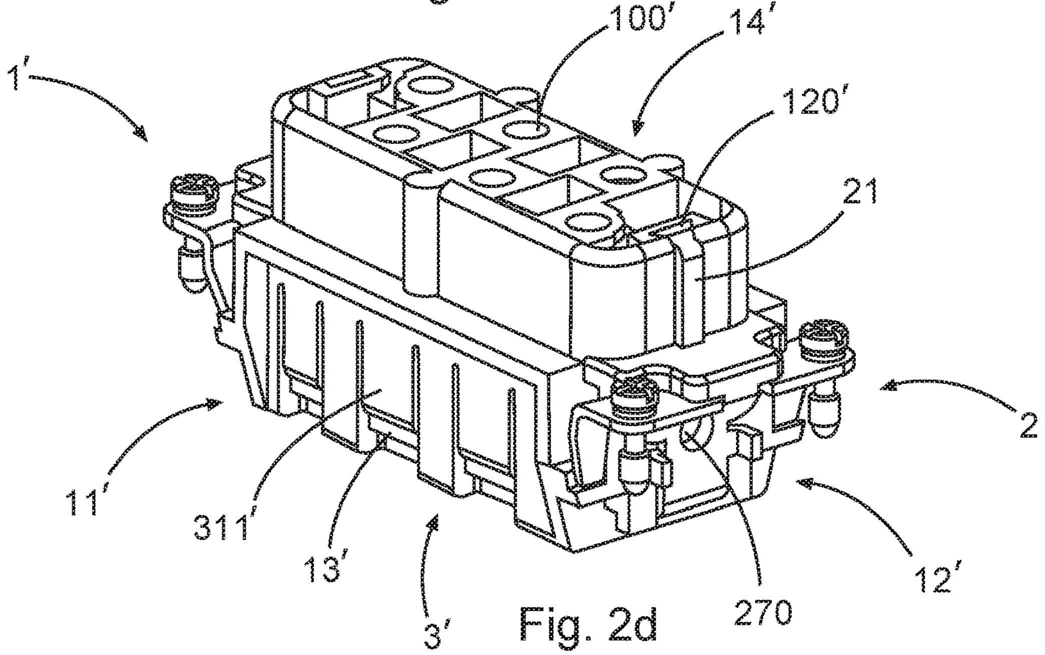
FIGS. 2*e-h* show the female contact carrier in various other views.

FIGS. 2*c* and 2*d* show the further insulating body, which has the female contact carrier 1' and a holding plate 3' latched onto the female contact carrier 1', in each case in an oblique plan view from the direction of its plug-in 14' or cable connection side 13'. This holding plate 3' is mirror-symmetrical to the aforementioned holding plate 3 (shown in FIG. 1*b*). The holding plate 3' has a base plate 33' which lies on the cable connection side 13' of the female contact carrier 1'. Contact bushings 30' are arranged in the base plate 33' and lie directly above one each of the contact chambers 100' of the female contact carrier 1'. Furthermore, on both sides, namely longitudinally, of the base plate 33', two side plates 31' are integrally molded which are opposite one another and engage the female contact carrier 1' on both sides, only one of which can be seen in each of these two embodiments. A plurality of latching elements in the form of latching tabs 311' are arranged in the side plates 31' and latch against an edge of the cable connection side 13'.

A grounding element 2 is attached to each of the narrow sides 12' of the female contact carrier 1'. As a result, a further contact insert which has the further insulating body with the two grounding elements 2 is suitable for direct installation in a plug-in connector housing and, if necessary, for ground connection to the latter. This further contact insert can be plugged with the aforementioned contact insert (shown in FIG. 1*b*).

Furthermore, it can be clearly seen in FIG. 2*d* how the plug-in portion 21 of the grounding element 2 engages in a connecting slot 120' of the female contact carrier 1' running in the plug-in direction.

Figure 2E:
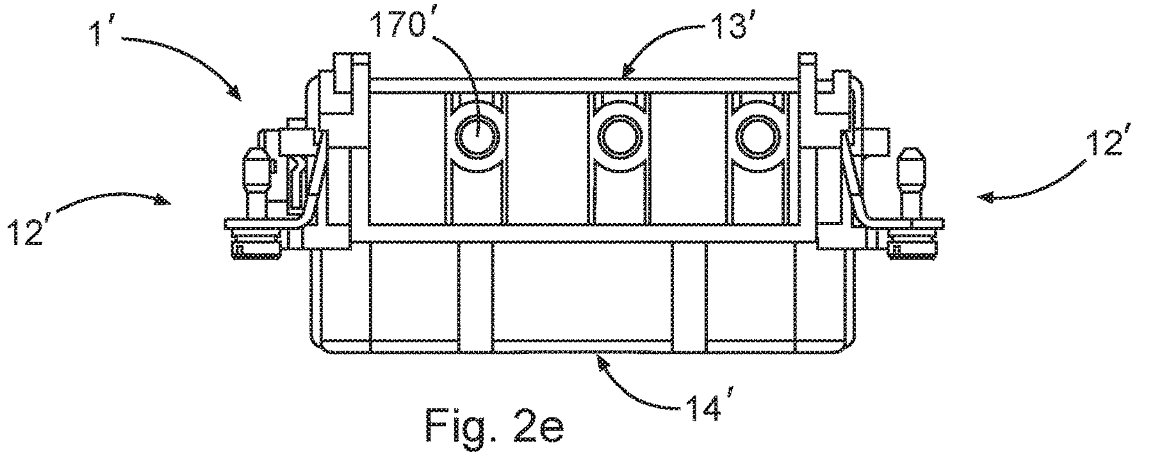

FIG. 2*e* shows the female contact carrier 1' in a side view looking at one of its longitudinal sides 11'.

Figure 2F:
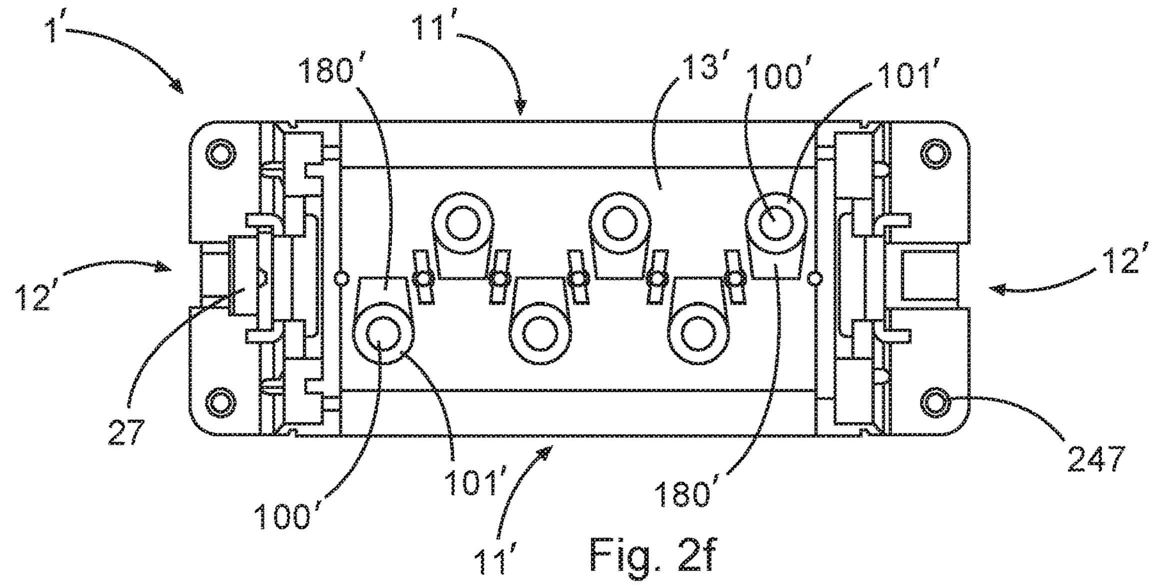

FIG. 2*f* shows the female contact carrier 1' in a plan view of its cable connection side 13'.

From this view, it can be clearly seen that the contact receptacle 100' has a taper in its interior in the form of an inner collar 101' as a feed stop for female contacts to be inserted (not shown). In addition, each contact chamber 100' has a screw connection receptacle 180', which in each case points in the direction of the opposite longitudinal side 11'.

Furthermore, a grounding screw 27 can be seen, which is screwed into one of the grounding elements 2.

Figure 2G:
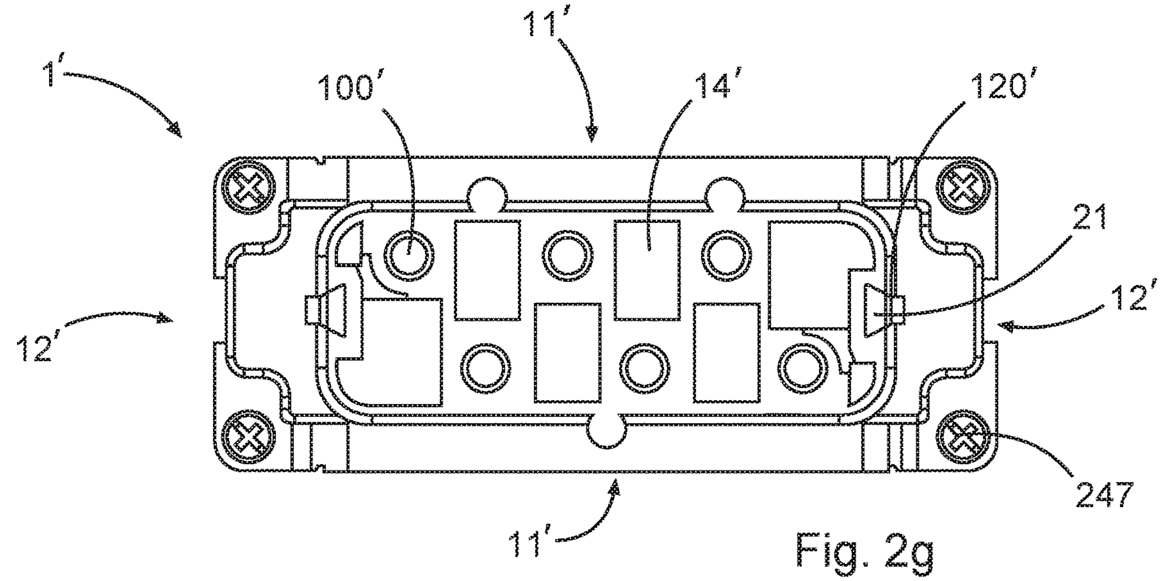

FIG. 2*g* shows the female contact carrier 1' from the opposite direction, namely looking at its plug-in side 14'. Here, it can also be clearly seen how the plug-in portion 21 of the grounding element 2 engages in a connecting slot 120' of the female contact carrier 1'.

Figure 2H:
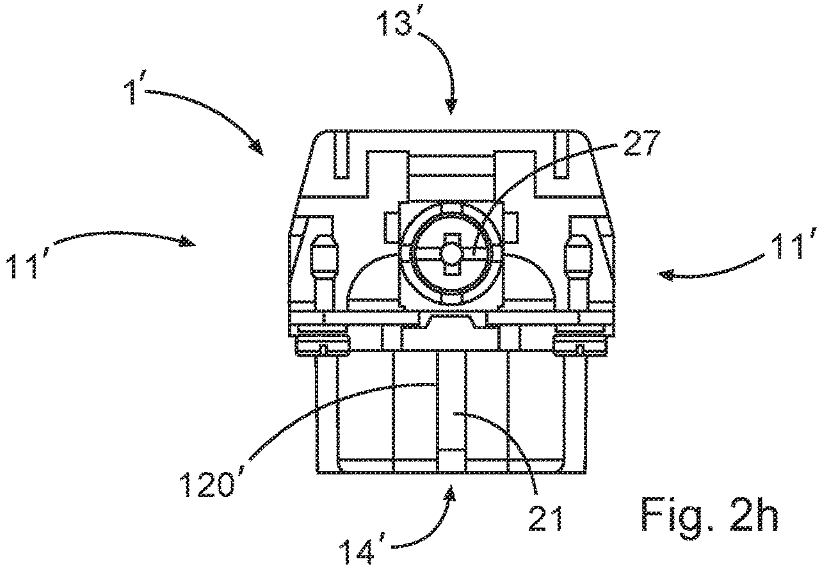

FIG. 2*h* shows the female contact carrier 1', as viewed from one of its narrow sides 12'.

Figure 3:
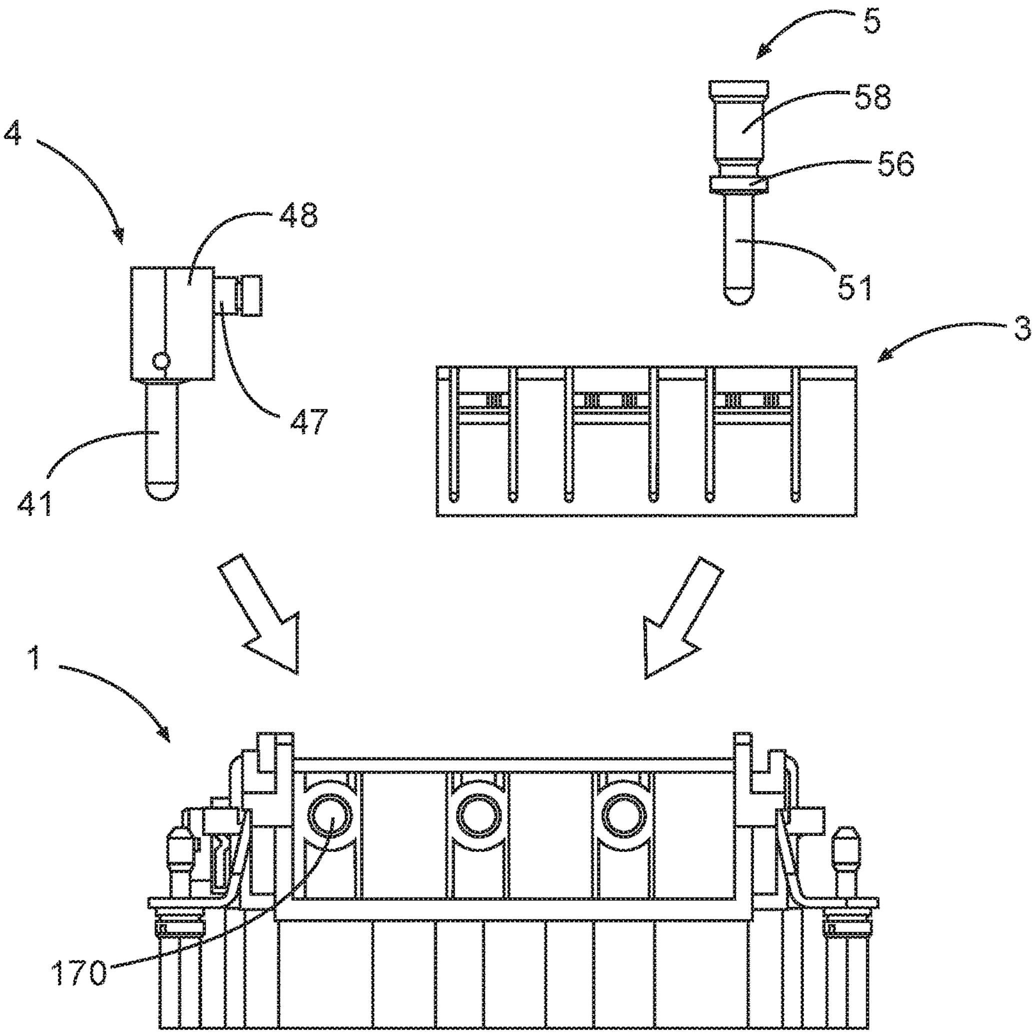
FIG. 3 shows a kit consisting of a contact carrier, a screw contact, a crimp contact, and a holding plate.

FIG. 3 shows a kit consisting of a contact carrier 1, a screw contact 4, a crimp contact 5, and the holding plate 3.

In this example, the contact carrier 1 shown is the male contact carrier 1 and the screw 4 and crimp contacts 5 are both male contacts. However, this selection is exemplary, as the kit principle could just as easily be applied to the female contact carrier 1' and female contacts (not shown in the drawing). For this reason, reference is made in the following to the contact carrier 1 and the screw contacts 4 as well as the crimp contacts 5, regardless of whether they are male 4,5 or female contacts or a male 1 or female contact carrier 1'.

The screw contact 4 has a screw connection 48 with a screw hole into which a contact screw 47 is screwed. The screw connection 48 has a cable-connection-side cavity, into which an electrical conductor, for example a stranded wire, can be inserted and electrically contacted by means of a screw connection of the contact screw 47 to the screw contact 4, and can be mechanically fixed thereto. In addition, the screw contact 4 has a plug-in region 41, which in this case is embodied as a contact pin 41.

The crimp contact 5 has a crimp connection 58 with a cable-connection-side cavity, into which an electrical conductor, such as a stranded wire, can be inserted and electrically contacted by means of crimping with the crimp contact 5, and mechanically fixed thereto. Furthermore, the crimp contact 5 has a holding collar 56 and a plug-in region 51, which in this case is embodied as a contact pin.

The screw contact 4 can be inserted into the contact chamber 100 of the contact carrier 1 without its contact screw 47, wherein its screw connection 48 is accommodated by the screw connection receptacle 180 of the contact chamber 100. The contact screw 47 can then be screwed laterally through the screw bushing 170 into the screw connection 48 of the screw contact 4, both to connect an electrical conductor to the screw contact 4 and to fix the screw contact 4 in the contact carrier 1.

The holding plate 3 can be latched onto the contact carrier 1. The crimp contact 5 can then be inserted into the contact chamber 100 and latched therein, as explained below.

Figure 4A:
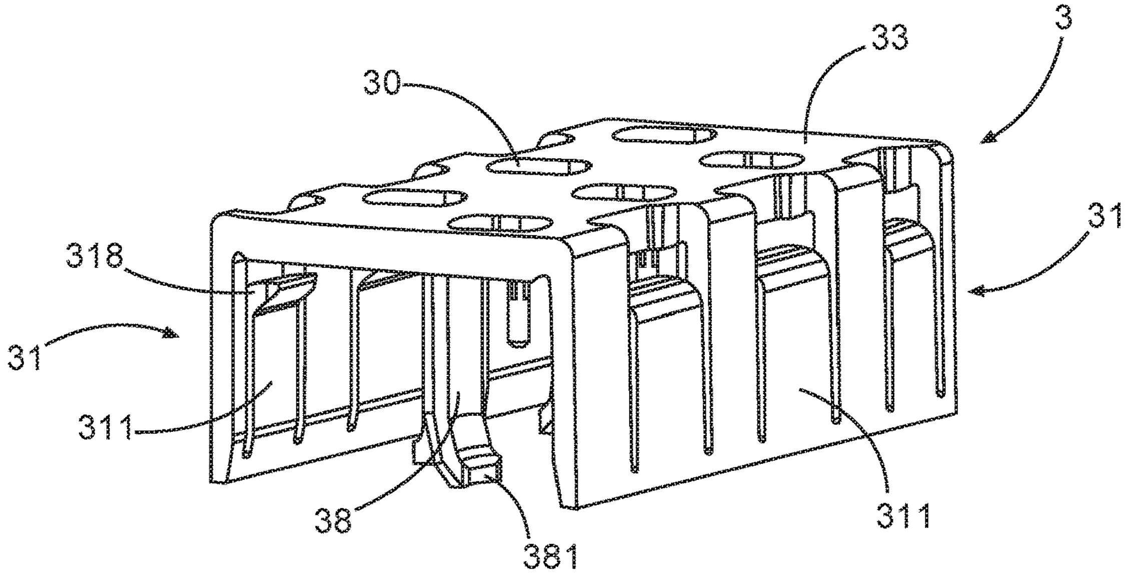
FIGS. 4*a-d* show the holding plate from different views.

FIG. 4*a* shows the holding plate 3 in detail. This has the substantially rectangular base plate 33. Substantially means here that its edges and/or corners may be rounded, that recesses may be present on its two long sides due to the latching elements 311 and their end latching portions 318, which serve for latching to the contact carrier 1, for example for manufacturing reasons. These recesses may also find application as de-latching recesses. Furthermore, said contact bushings 30 may be arranged in the base plate 33.

The two side plates 31, which are opposite one another and point in a common direction, are integrally molded longitudinally on the substantially rectangular base plate 33. In each of these side plates 31 there are arranged the latching elements 311 for said latching of the holding plate 3 to the contact carrier 1. The latching elements are latching tabs 311.

A latching arm 38 is integrally molded on the base plate 33 at each contact bushing 30 and points in the same direction as the two side parts 31.

Figure 4B:
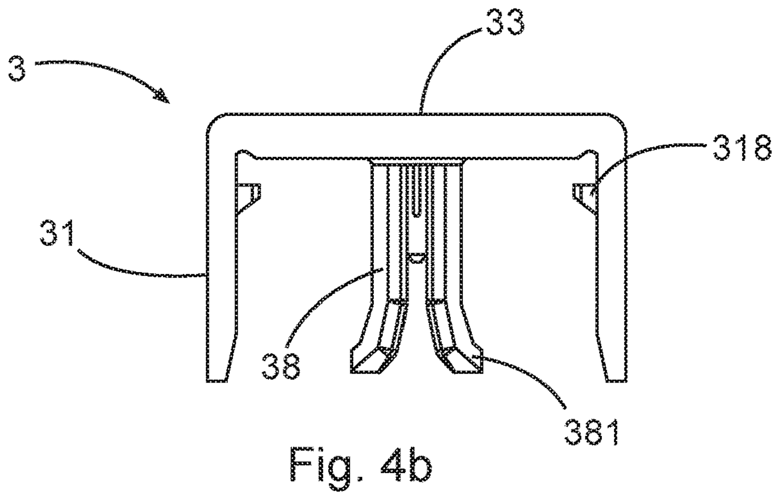

The shape of this latching arm 38 can be seen particularly well in FIG. 4*b*. At its free-standing end, each latching arm 38 has a latching hook 381, by means of which it can cooperate with the holding collar 56 of the crimp contact 5 according to the principle of a barb.

Coming from the direction of the base plate 33, more precisely through one of the contact bushings 30 (that is to say in FIGS. 4*a* and 4*b* from above), the crimp contact 5 first engages with a slide-on slope (not described in greater detail) of the latching arm 38 and thus pushes the latching hook 381 to the side in order to then latch with its holding collar 56 behind (that is to say in FIGS. 4*a* and 4*b* below) the latching hook 381 of the spring-back latching arm 38. It is easy to understand that the crimp contact 5 in the latched state can no longer be readily moved in the opposite direction, (that is to say in FIGS. 4*a* and 4*b* from bottom to top), since its holding collar 56 cants behind a latching face of the latching hook 381 facing away from the base plate 33.

Figure 4C:
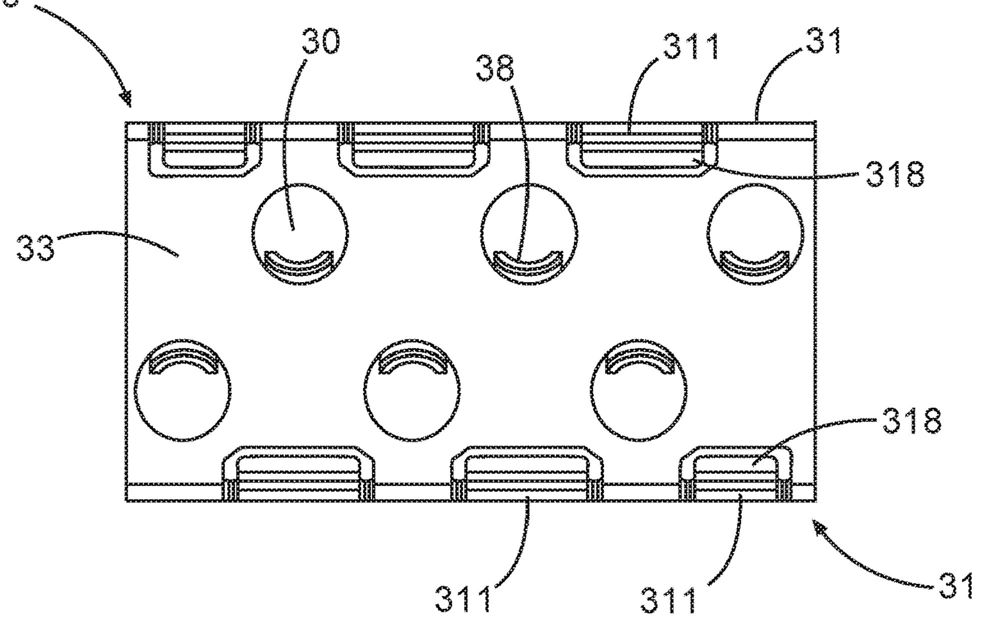

FIG. 4*c* shows the holding plate 3 in a plan view of its base plate 33. Here, the arrangement of the contact bushings 30 with the latching hooks 381 integrally molded thereon and the geometric arrangement of the latching elements 311 with their latching portions 318 can be seen particularly well.

Figure 4D:
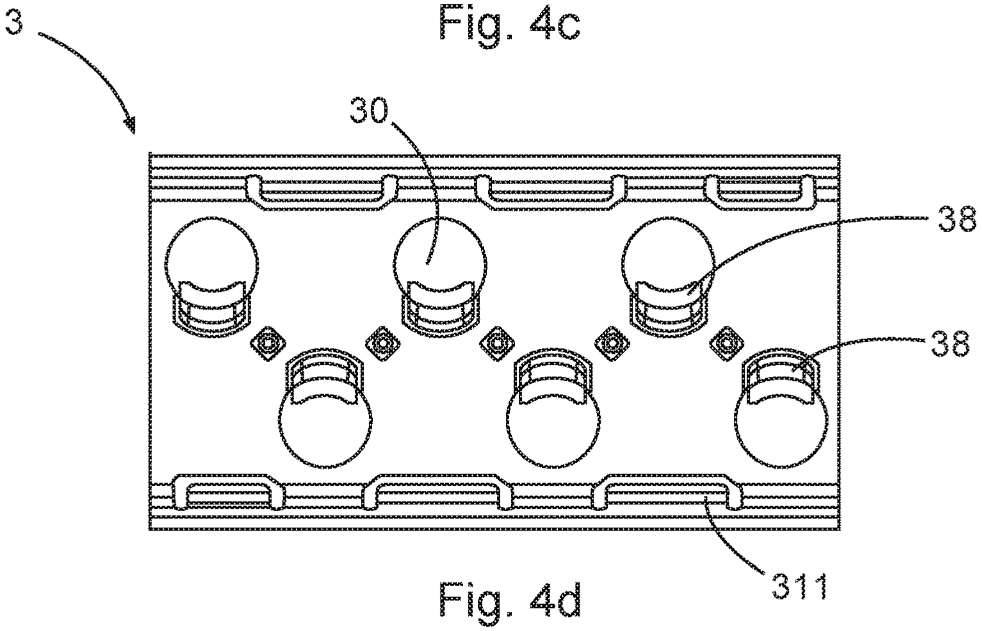

FIG. 4*d* shows the holding plate 3 from the opposite direction.

Figure 5A:
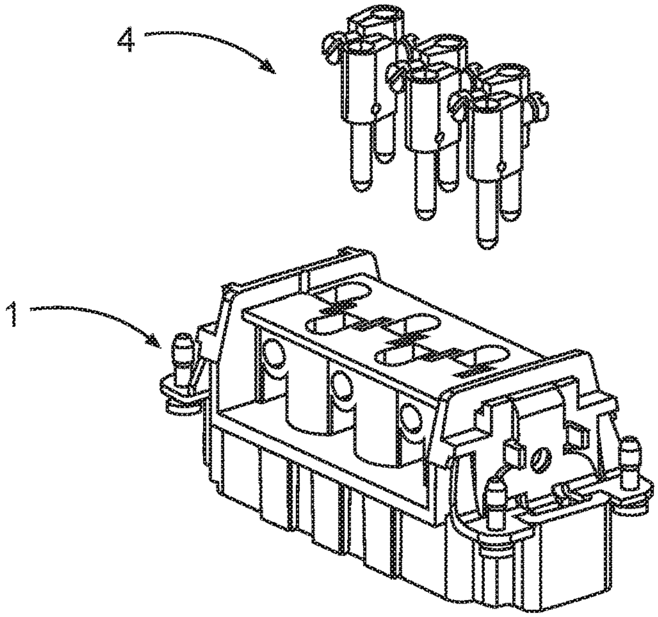
FIG. 5*a* shows the contact carrier with a set of screw contacts.

FIG. 5*a* shows the contact carrier 1 with a group of screw contacts 4 to be inserted therein. These are inserted into the contact carrier 1 as previously described and screwed therein by means of their contact screws 47 as previously described.

Figure 5B:
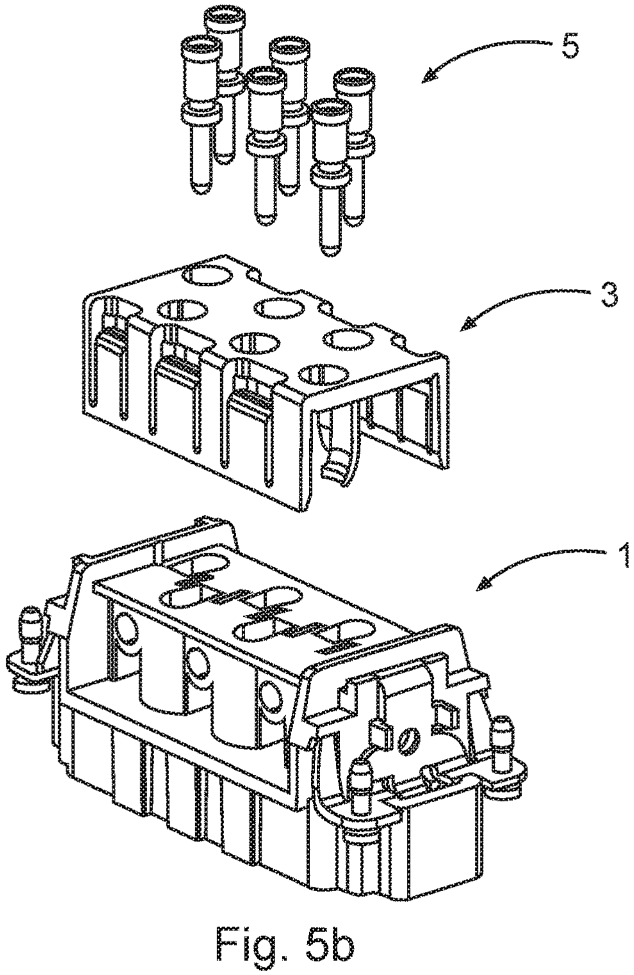
FIG. 5*b* shows the contact carrier with the holding plate and a set of crimp contacts.

FIG. 5*b* shows analogously the same contact carrier 1 with the holding plate 3 and a set of crimp contacts 5 to be inserted therein. The holding plate 3 can be latched on the contact carrier 1, as already described. Thereupon, as already described, the crimp contacts 5 are insertable into the contact chambers 100 of the insulating body, comprising the contact carrier 1 and the holding plate 3 latched thereto, and are in turn latchable therein. For reasons of clarity, the electrical conductors crimped to the usually preassembled crimp contacts 5 are not shown here.

Even though various aspects or features of the invention are each shown in combination in the FIGS., it is apparent to the person skilled in the art—unless otherwise indicated—that the combinations shown and discussed are not the only possible ones. In particular, corresponding units or feature combinations from different exemplary embodiments may be interchanged with each other.

LIST OF REFERENCE SIGNS

1 contact carrier, male contact carrier
1' further contact carrier, female contact carrier
100, 100' contact chambers

101, 101' taper, feed stop, inner collar
11, 11' longitudinal sides
12, 12' narrow sides
120, 120' connecting slot
122 grounding element receptacle
13, 13' cable connection side
14, 14' plug-in side
140 plug-in frame
170, 170' screw bushing
180 screw connection receptacle
2 grounding element
21 plug-in portion
24 fastening flange
247 fixing screw
27 grounding screw
3,3' holding plate
30, 30' contact bushings
31, 31' side plate
311, 311' latching elements/latching tabs
318 latching portion
33, 33' base plate
38 latching arm
381 latching hook
4 screw contact
41 plug-in region (contact pin of the screw contact)
47 contact screw
48 screw connection
5 crimp contact
51 plug-in region (contact pin of the crimp contact)
56 holding collar
58 crimp connection

The invention claimed is:

1. An insulating body, comprising:

a contact carrier (1, 1'); and a holding plate (3, 3') which can be latched to the contact carrier (1, 1'), wherein the contact carrier (1, 1') has two mutually opposite longitudinal sides (11, 11') oriented in a longitudinal direction of the insulating body and two mutually opposite narrow sides (12, 12') oriented perpendicularly thereto, a cable connection side (13, 13'), and a plug-in side (14, 14'), wherein the contact carrier (1, 1') has contact chambers (100, 100') which, running in a plug-in direction, connect the cable connection side (13, 13') to the plug-in side (14, 14'), wherein a first group of contact chambers (100, 100') is arranged close to a first of the longitudinal sides (11, 11'), and wherein a second group of contact chambers (100, 100') is arranged close to a second of the longitudinal sides (11, 11'), and wherein the contact chambers (100, 100') of the first group and the contact chambers (100, 100') of the second group are arranged offset from one another in the longitudinal direction, whereby the first of the longitudinal sides (11, 11') is a proximal longitudinal side and the second of the longitudinal sides (11, 11') is a distal longitudinal side for each of the contact chambers (100, 100') of the first group, and vice versa the first of the longitudinal sides (11, 11') is the distal longitudinal side and the second of the longitudinal sides (11, 11') is the proximal longitudinal side for each of the contact chambers (100, 100') of the second group, wherein the contact chambers (100, 100') are cylindrical at their plug-in-side end, and wherein the contact chambers (100, 100') have, at their cable-connection-side end, in addition to their cylindrical shape, in each case include a screw connection receptacle (180, 180') which adjoins the end laterally and which points in the direction of the distal longitudinal side (11, 11') and which, for fixing and contacting on the cable connection side a screw contact (4) inserted or to be inserted into the contact chamber (100, 100') by a contact screw (47) through a screw bushing (170) running in the direction of the distal longitudinal side (11, 11'), is open towards this distal longitudinal side (11, 11'), and wherein the holding plate (3, 3') has a substantially rectangular base plate (33, 33') on which two side plates (31, 31') are integrally molded longitudinally opposite one another and pointing in a common direction, wherein latching elements (311, 311') are arranged in each of the two side plates (31, 31') for the latching of the holding plate (3, 3') to the contact carrier (1, 1'), wherein each of the latching elements (311, 311') includes an arm extending between two slots from a distal end of a respective one of the two side plates (31, 31') towards the substantially rectangular base plate (33, 33'), and an inwardly protruding latching portion (318) formed at a free end of the arm, wherein the latching elements (311, 311') in the two side plates (31, 31') are offset from one another, wherein the base plate (33, 33') in a latched state comes to lie on the cable connection side (13, 13') of the contact carrier (1, 1'), and wherein contact bushings (30, 30') are arranged in the base plate (33, 33') which, in the latched state, are arranged above respective contact chambers (100, 100'), wherein the base plate (33, 33'), in the latched state, engages with a latching arm (38) arranged at its contact bushings (30, 30') into the screw connection receptacle (180, 180') of the corresponding contact chamber (100, 100') of the contact carrier (1, 1') in order to fix a crimp contact (5) inserted or to be inserted into the contact chamber (100, 100').

2. The insulating body as claimed in claim 1, wherein a latching lug is integrally molded on each of the two narrow sides (12, 12') of the contact carrier (1, 1').

3. The insulating body as claimed in claim 2, wherein the two latching lugs differ in shape and/or size to ensure correct orientation of the insulating body.

4. A plug-in connector module to be accommodated in a holding frame, comprising the insulating body as claimed in claim 2 and at least one crimp contact (5).

5. A plug-in connector modular system comprising a holding frame and at least one plug-in connector module as claimed in claim 4.

6. A plug-in connector, comprising a plug-in connector housing and a plug-in connector modular system as claimed in claim 5.

7. The insulating body as claimed in claim 1, wherein the contact carrier (1, 1') has a metal grounding element (2) on each of its two narrow sides (12, 12'), wherein the grounding element (2) has in each case a fastening flange (24) with in each case at least two screw apertures.

8. The insulating body as claimed in claim 7, wherein a connecting slot (120, 120') running in the plug-in direction is arranged on each of the two narrow sides (12, 12') of the contact carrier (1, 1'), wherein the grounding element has a plug-in portion (21), wherein the plug-in portion (21) engages in the connecting slot (120, 120') and the fastening flange (24) of the grounding element (2) is oriented parallel to the plug-in side (14, 14') of the contact carrier (1, 1').

9. A contact insert for installation in a plug-in connector housing, comprising an insulating body as claimed in claim 7, and at least one crimp contact (5).

10. A plug-in connector, comprising a plug-in connector housing and a contact insert as claimed in claim 9.

11. A kit, comprising at least the following components:

the insulating body as claimed in claim 1;

at least one screw contact (4);

at least one contact screw (47); and at least one crimp contact (5), wherein both the screw contact (4) and the crimp contact (5) each have a plug-in region (41, 51) and a cable connection region (48, 58) with a cable-connection-side cavity for receiving, fixing, and making electrical contact with an electrical conductor, wherein the cable connection region of the screw contact (4) has a screw connection (48) with a screw hole, wherein the screw hole directly adjoins the cable-connection-side cavity of the screw connection (48), wherein the screw hole has an internal thread, wherein the screw contact (4) is insertable into a contact chamber (100, 100') of the contact carrier (1, 1'), wherein the screw connection (48) is receivable by the screw connection receptacle (180) of the contact carrier (1, 1') so that the screw hole directly adjoins the screw bushing (170) of the contact carrier (1) so that the contact screw (47) can be guided through the screw bushing (170) and can be screwed into the screw hole and thus into the cavity of the screw contact (4) in order to electrically connect an electrical conductor inserted into the cavity on the cable connection side to the screw contact (4) and simultaneously to fix the screw contact (4) in the contact carrier (1, 1'), wherein the cable connection region of the crimp contact (5) has a hollow-cylindrical crimp connection (58), through which the cable-connection-side cavity is formed, and wherein the crimp contact (5) further comprises a holding collar (56) between its cable connection region (58) and its plug-in region (51), wherein the crimp contact (5) can be guided through one of the contact bushings (30, 30') of the holding plate (3, 3') latched to the contact carrier (1, 1') and can be inserted into the contact chamber (100, 100') of the contact carrier (1, 1') until its holding collar (56) abuts a taper (101, 101') of the contact chamber (100, 100') acting as a feed stop, wherein the crimp contact (5) can be ultimately fixed in the contact chamber (100, 100') of the contact carrier (1, 1') by its collar (56) latching on the latching arm (38) of the holding plate (3, 3').

* * * * *